(12) United States Patent
Takahashi

(10) Patent No.: US 8,895,911 B2
(45) Date of Patent: Nov. 25, 2014

(54) OPTICAL ENCODER WITH MISALIGNMENT DETECTION AND ADJUSTMENT METHOD ASSOCIATED THEREWITH

(75) Inventor: Tomotaka Takahashi, Tsukuba (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 198 days.

(21) Appl. No.: 13/359,789

(22) Filed: Jan. 27, 2012

(65) Prior Publication Data

US 2012/0193523 A1     Aug. 2, 2012

(30) Foreign Application Priority Data

Jan. 27, 2011    (JP) .................................. 2011-014897

(51) Int. Cl.
    *G01D 5/38*        (2006.01)
    *G01D 5/347*      (2006.01)
    *G01D 5/244*      (2006.01)

(52) U.S. Cl.
    CPC .............. *G01D 5/24457* (2013.01); *G01D 5/38* (2013.01)
    USPC ................... 250/231.1; 250/231.16; 356/619; 702/159; 702/163

(58) Field of Classification Search
    CPC . G01D 5/347; G01D 5/34707; G01D 5/3473; G01D 5/34746; G01D 5/38; G01D 5/24457
    USPC .............. 250/231.1, 231.13, 231.14, 231.16; 341/13; 356/616, 618, 619; 702/150, 702/151, 158, 159, 163
    See application file for complete search history.

(56) References Cited

U.S. PATENT DOCUMENTS

| 3,757,126 | A | * | 9/1973 | Tumbush | 250/252.1 |
|---|---|---|---|---|---|
| 4,360,730 | A | * | 11/1982 | Breslow | 250/231.13 |
| 4,883,955 | A | * | 11/1989 | Kawasaki et al. | 250/231.16 |
| 4,912,322 | A | * | 3/1990 | Ichikawa | 250/237 G |
| 5,005,089 | A | * | 4/1991 | Thanos et al. | 360/77.08 |
| 5,128,609 | A | * | 7/1992 | Howley | 324/121 R |
| 5,241,173 | A | * | 8/1993 | Howley et al. | 250/231.16 |

(Continued)

FOREIGN PATENT DOCUMENTS

| EP | 1972902 | 9/2008 |
|---|---|---|
| JP | 2004-053605 | 2/2004 |

(Continued)

OTHER PUBLICATIONS

European Search Report dated Jul. 28, 2014, 6 pages.

*Primary Examiner* — John Lee
(74) *Attorney, Agent, or Firm* — Rankin, Hill & Clark LLP

(57) ABSTRACT

An optical encoder includes a scale having diffraction gratings formed at predetermined pitches in a measurement axis direction, a detection head relatively movable with respect to the scale, the detection head including a light source portion configured to irradiate the scale with light, and a plurality of receiver portions configured to receive light reflected by or transmitted through the diffraction gratings of the scale, at different phases, and a signal processing device configured to perform signal processing to light reception signals output from the receiver portions of the detection head, to produce quadrature differential signals. The signal processing device is configured to calculate alignment adjustment monitor signals corresponding to a Lissajous radius of the quadrature differential signals in order to detect misalignment of the detection head with respect to the scale.

14 Claims, 13 Drawing Sheets

LENGTH MEASURING DIRECTION X

(56) References Cited

U.S. PATENT DOCUMENTS

| | | | |
|---|---|---|---|
| 5,789,913 A * | 8/1998 | Mager | 324/76.79 |
| 5,883,298 A * | 3/1999 | Holzapfel et al. | 73/1.79 |
| 5,973,620 A * | 10/1999 | Holzapfel et al. | 341/11 |
| 6,220,099 B1 * | 4/2001 | Marti et al. | 73/633 |
| 6,807,499 B2 * | 10/2004 | Burgschat et al. | 702/94 |
| 6,900,793 B2 * | 5/2005 | Goh et al. | 345/164 |
| 6,996,494 B2 * | 2/2006 | Braasch et al. | 702/150 |
| 7,053,362 B2 * | 5/2006 | Tobiason et al. | 250/231.16 |
| 7,067,797 B1 * | 6/2006 | Mitchell et al. | 250/231.13 |
| 7,091,475 B2 * | 8/2006 | Tobiason | 250/231.16 |
| 7,211,782 B2 * | 5/2007 | Tobiason et al. | 250/227.11 |
| 7,550,710 B2 * | 6/2009 | McAdam | 250/231.13 |
| 7,839,296 B2 * | 11/2010 | Howley | 340/815.45 |
| 8,173,951 B2 * | 5/2012 | Takahashi | 250/231.16 |
| 8,402,077 B2 * | 3/2013 | Taniguchi et al. | 708/605 |
| 8,476,579 B2 * | 7/2013 | York | 250/231.14 |
| 2004/0155178 A1 * | 8/2004 | Ito | 250/231.13 |
| 2005/0023451 A1 * | 2/2005 | Horton | 250/231.14 |
| 2006/0076480 A1 * | 4/2006 | Kiriyama et al. | 250/231.16 |
| 2010/0072348 A1 * | 3/2010 | Takahashi | 250/206.1 |
| 2010/0312394 A1 * | 12/2010 | Arimitsu | 700/260 |
| 2012/0193523 A1 * | 8/2012 | Takahashi | 250/231.1 |

FOREIGN PATENT DOCUMENTS

| | | |
|---|---|---|
| JP | 2008-039602 | 2/2006 |
| JP | 2007-232681 | 9/2007 |
| WO | 90/02956 | 3/1990 |

* cited by examiner

OPTICAL ENCODER WITH MISALIGNMENT DETECTION AND ADJUSTMENT METHOD ASSOCIATED THEREWITH

CROSS REFERENCE TO RELATED APPLICATION(S)

This application is based upon and claims the benefit of priority from Japanese Patent Application No. 2011-014897 filed on Jan. 27, 2011, the entire contents of which are incorporated herein by reference.

TECHNICAL FIELD

The present invention described herein relates to the field of optical encoders, and a misalignment detection and an adjustment method associated therewith.

RELATED ART

As one of optical encoders of this kind, is known an optical encoder which uses a linear scale having diffraction gratings. In such an optical encoder, coherent light emitted from the light source is diffracted by the linear scale, and an interference fringe having position information is generated. When the interference fringe is phase detected, a length in the direction along the scale can be measured (see Patent Reference 1). In an optical encoder of this kind, conventionally, adjustment of misalignment of a detection head is performed by adjusting the relative positional relationship between the detection head and the scale while moving the detection head along the scale and viewing an output Lissajous signal. In this case, with respect to a detection head having a relatively large size, a mechanical reference for the scale can be easily set, and, when the detection head is to be mounted, the best alignment state can be ensured to some extent. With respect to a detection head having a relatively small size (Patent References 1 and 2), however, a mechanical reference is hardly set, and, when the detection head is to be mounted, a work of adjusting misalignment is necessary.

In the case where a space for performing adjustment of misalignment cannot be easily ensured, such as the case where an optical encoder is to be incorporated into a stage of a three-dimensional measuring apparatus, the above-discussed method is hardly performed. In order to comply with such a case, a method of performing adjustment of misalignment in a resting state (i.e., without moving a detection head along a scale) has been proposed (Patent Reference 3).

PRIOR ART REFERENCE

Patent Reference

[Patent Reference 1] JP-A-2004-53605
[Patent Reference 2] JP-A-2008-39602
[Patent Reference 3] JP-A-2007-232681

Patent Reference 3 proposes a method in which signals produced based on light received by a plurality of light receiving sections that are disposed in a detection head are compared with each other, thereby detecting the rotation amounts of the detection head in Pitch and Roll directions. In the patent reference, however, detection of the rotation amount in Yaw direction in a resting state is not proposed. The detection of the rotation amount in Yaw direction remains to be performed in a conventional method.

SUMMARY

Exemplary embodiments of the invention provide an optical encoder and a method of adjusting misalignment of a detection head in which misalignment of the detection head can be easily adjusted.

An optical encoder according to the invention comprises: a scale having diffraction gratings formed at predetermined pitches in a measurement axis direction;
a detection head relatively movable with respect to the scale, the detection head including a light source portion configured to irradiate the scale with light, and a plurality of receiver portions configured to receive light reflected by or transmitted through the diffraction gratings of the scale, at different phases; and
a signal processing device configured to perform signal processing to light reception signals output from the receiver portions of the detection head, to produce quadrature differential signals, wherein
the signal processing device is configured to calculate posture monitor signals corresponding to a Lissajous radius of the quadrature differential signals in order to detect misalignment of the detection head with respect to the scale.

According to the invention, the Lissajous radius can be obtained and the rotation angle of the detection head in the Yaw direction can be detected without moving the detection head or the scale.

In the optical encoder according to one embodiment of the invention, the plurality of receiver portions may be four receiver portions placed respectively in upper left, upper right, lower left, and lower right places centered at the light source portion, the four receiver portions being configured to receive light reflected by or transmitted through diffraction gratings of the scale that are different in spatial phase by 90° from each other, and the signal processing device may be configured to perform an arithmetic process to the light reception signals output from the four receiver portions to produce the quadrature differential signals.

A method of adjusting misalignment according to one embodiment of the invention, comprises:
adjusting misalignment of the detection head in a Yaw direction with respect to the scale so that a monitor signal has a maximum value, the monitor signal being the Lissajous radius of the quadrature differential signals output from the signal processing device, or a squaring value of the Lissajous radius.

Alternatively, in the optical encoder according to another embodiment of the invention, the signal processing device may be configured to approximate the Lissajous radius or a squaring value of the Lissajous radius to a characteristic function, and to obtain an inverse function or differential function of the characteristic function, as a monitor signal.

A method of adjusting misalignment according to the other embodiment of the invention, comprises:
adjusting misalignment of the detection head in a Yaw direction with respect to the scale so that the monitor signal is within an allowable range.

According to the invention, it is possible to provide an optical encoder and a method of adjusting misalignment of a detection head in which misalignment of the detection head can be easily adjusted.

DETAILED DESCRIPTION

First Embodiment

Next, an optical encoder of a first embodiment of the invention will be described in detail with reference to the drawings.

Figure 1:
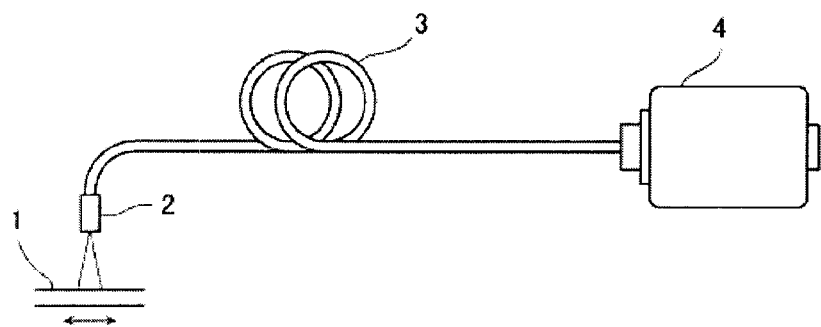
FIG. 1 is a view showing a configuration of an optical encoder of a first embodiment of the invention.

FIG. 1 is a view showing the configuration of the optical encoder of the first embodiment of the invention. The optical encoder of the first embodiment of the invention includes: a scale 1 in which reflection type diffraction gratings are formed at predetermined pitches in the measurement axis direction; and a detection head 2 that is opposed to the surface of the scale 1 in which the diffraction gratings are formed, through a predetermined gap, and that is relatively movable with respect to the scale 1. The detection head 2 is connected to a signal processing device 4 through a cable 3.

Figures 2A, 2B:
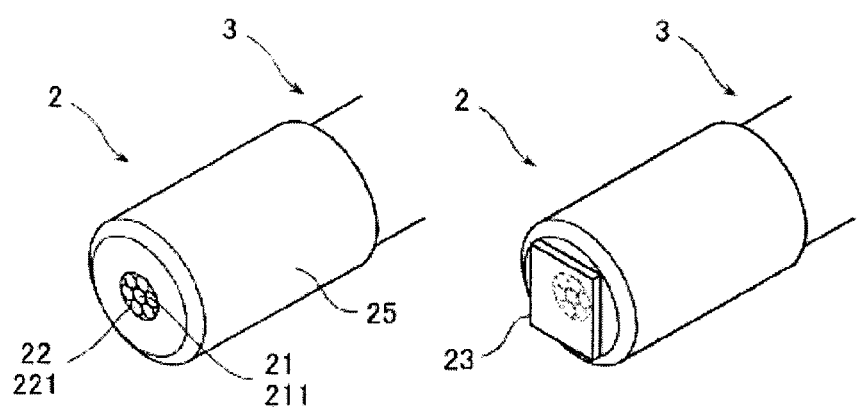
FIGS. 2A and 2B are schematic views each showing a detection head of the optical encoder.

FIGS. 2A and 2B are schematic views showing the detection head 2 in the above-described optical encoder. In the embodiment, the cable 3 is configured by bundling a plurality of optical fibers. The cable 3 is configured by bundling six receiver optical fibers 221 around a light source optical fiber 211. Tip end portions of the cables 3 are covered by a ferrule 25 to configure the detection head 2. For example, a single-mode fiber is used as the light source optical fiber 211, and multi-mode fibers are used as the receiver optical fibers 221. As shown in FIG. 2A, the tip end of the light source optical fiber 211 configures a light source portion 21, and the tip ends of the receiver optical fibers 221 configure receiver portions 22, respectively. As shown in FIG. 2B, a mask 23 having transmission type diffraction gratings is attached to the front surfaces of the light source portion 21 and the receiver portions 22.

Figure 3:
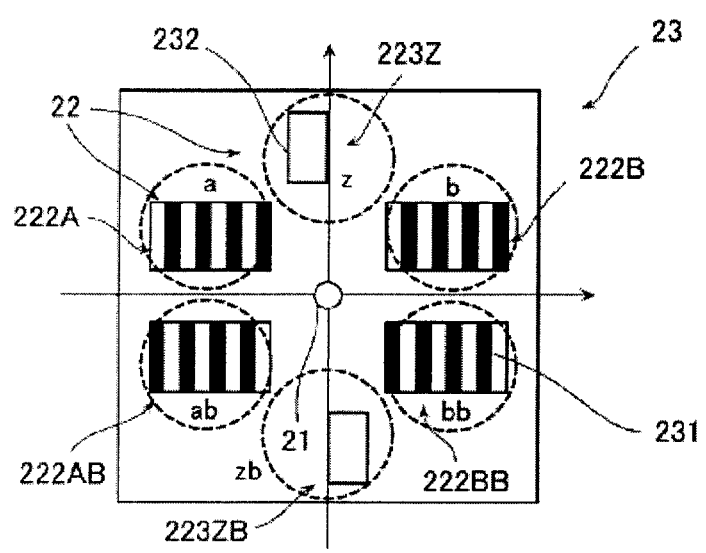
FIG. 3 is a view showing a mask of the optical encoder.

FIG. 3 is a view showing in detail the mask 23. Namely, four receiver portions 22 are placed respectively in upper left, upper right, lower left, and lower right places centered at the light source portion 21. The four receiver portions 22 are formed as a phase detection receiver portion 222 which detects phase of displacement. Two receiver portions 22 which are placed respectively in upper center and lower center places are formed as a posture monitor receiver portion 223 which also has a function of detecting the origin (zero). The mask 23 includes four transmission type phase detection diffraction gratings 231 and two posture monitor windows 232. The four transmission type phase detection diffraction gratings 231 and two posture monitor windows 232 are disposed so as to be located on the front surfaces of the phase detection receiver portion 222 and the posture monitor receiver portion 223, respectively. A central portion of the mask 23 which is located on the front surface of the light source portion 21 is configured so that light emitted from the light source portion 21 transmits therethrough as it is.

The upper left, upper right, lower left, and lower right phase detection diffraction gratings 231 form phase gratings of a-, b-, ab-, and bb-phase having spatial phase relationships of 0°, 90°, 180°, and 270° at equal pitches, respectively. Hereinafter, the phase detection receiver portions 222 are referred to as receiver portions 222A, 222B, 222AB, 222BB, respectively. In the posture monitor receiver portions 223, the portion which is disposed in the positive direction of the Y-axis is denoted by 223Z, and that which is disposed in the negative direction of the Y-axis is denoted by 223ZB. The posture monitor receiver portions 223Z, 223ZB function also as a zero-point detecting portions.

Figure 4:
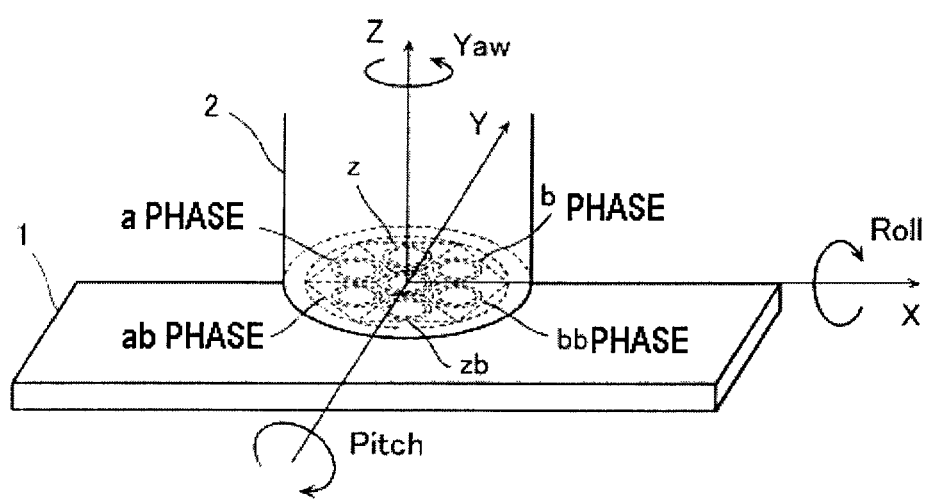
FIG. 4 is a view showing an attachment posture of the detection head of the optical encoder.

FIG. 4 is a view showing the attachment posture of the detection head 2 of the optical encoder of the first embodiment of the invention. In the description, the relative moving direction of the detection head 2 with respect to the scale 1 is indicated as the X direction (measurement axis direction), the direction which is parallel to the surface of the scale 1, and which is perpendicular to the X direction is indicated as the Y direction, and the direction which is perpendicular to the X and Y directions, i.e., that which is perpendicular to the surface of the scale 1 is indicated as the Z direction. The inclination between the scale 1 and the detection head 2 in the X-Z plane is indicated as the Pitch direction, that in the Y-Z plane is indicated as the Roll direction, and that in the X-Y plane is indicated as the Yaw direction.

Figure 5:
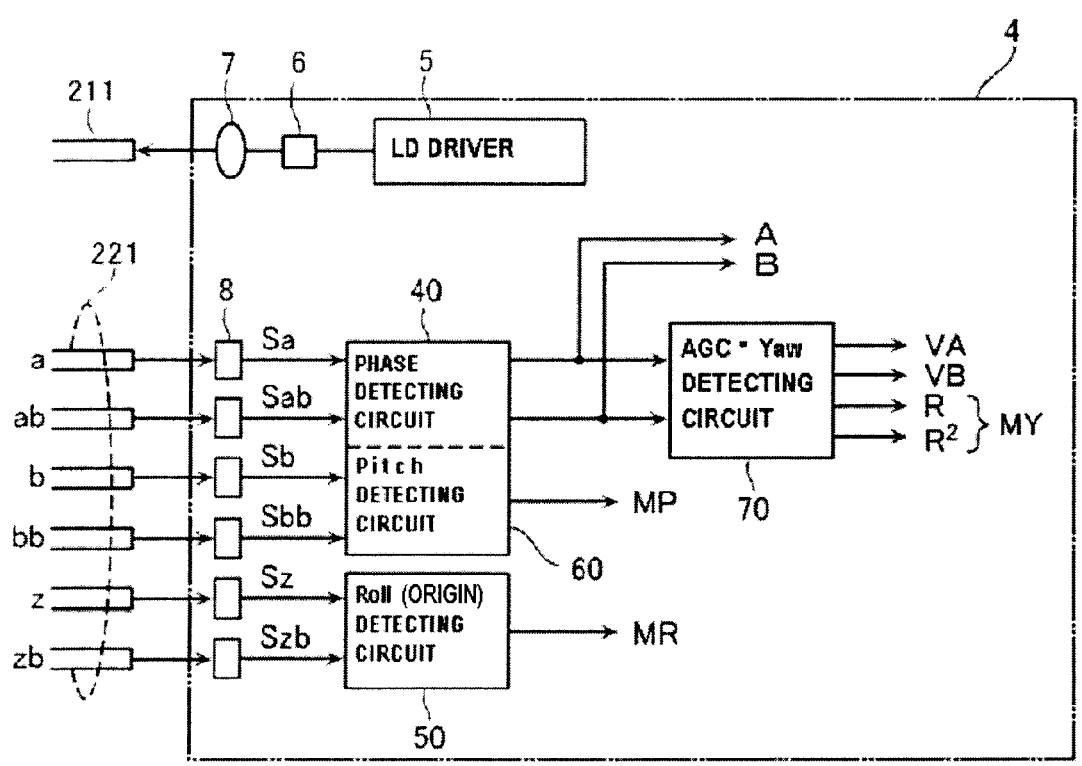
FIG. 5 is a block diagram showing a configuration of a signal processing device of the optical encoder.

Next, the signal processing device 4 of the optical encoder will be described. FIG. 5 is a block diagram showing the configuration of the signal processing device 4 of the optical encoder of the first embodiment of the invention.

The signal processing device 4 has, for example, an LD 6 as a light source to which a basal end portion of the light source optical fiber 211 is connected via an optical system 7. The LD 6 is driven by a LD driver 5 to emit coherent light. The coherent light is guided to the core of the light source optical fiber 211 via an optical system 7, and then irradiated from the light source portion 21 toward the scale 1.

The signal processing device 4 further has six light receiving elements 8 to which basal end portions of the receiver optical fibers 221 are connected. The six light receiving elements 8 output phase signals Sa, Sab, Sb, Sbb having phases of 0°, 90°, 180°, and 270°, and posture monitor signals Sz, Szb, respectively. The phase signals Sa, Sab, Sb, Sbb are input to a phase detecting circuit 40 and a Pitch detecting circuit 60, and the posture monitor signals Sz, Szb are input to a Roll detecting circuit 50 which also has a function of detecting the origin. The phase detecting circuit 40 performs an arithmetic process to the phase signals Sa, Sab, Sb, Sbb to output quadrature differential signals A, B indicating the displacement of the detection head 2 with respect to the scale 1. The Pitch detecting circuit 60 performs an arithmetic process to the phase signals Sa, Sab, Sb, Sbb to output a posture monitor signal MP of the Pitch direction. The Roll detecting circuit 50 performs an arithmetic process to the posture monitor signals Sz, Szb to output a posture monitor signal MR of the Roll direction or output an origin signal corresponding to the origin position. An AGC/Yaw detecting circuit 70 performs an arithmetic process to the quadrature differential signals A, B which are output from the phase detecting circuit 40, to output normalized quadrature differential signals VA, VB, and the Lissajous radius R of the quadrature differential signals A, B or a squaring value $R^2$ of the Lissajous radius as a posture monitor signal MY of the Yaw direction.

Figure 6:
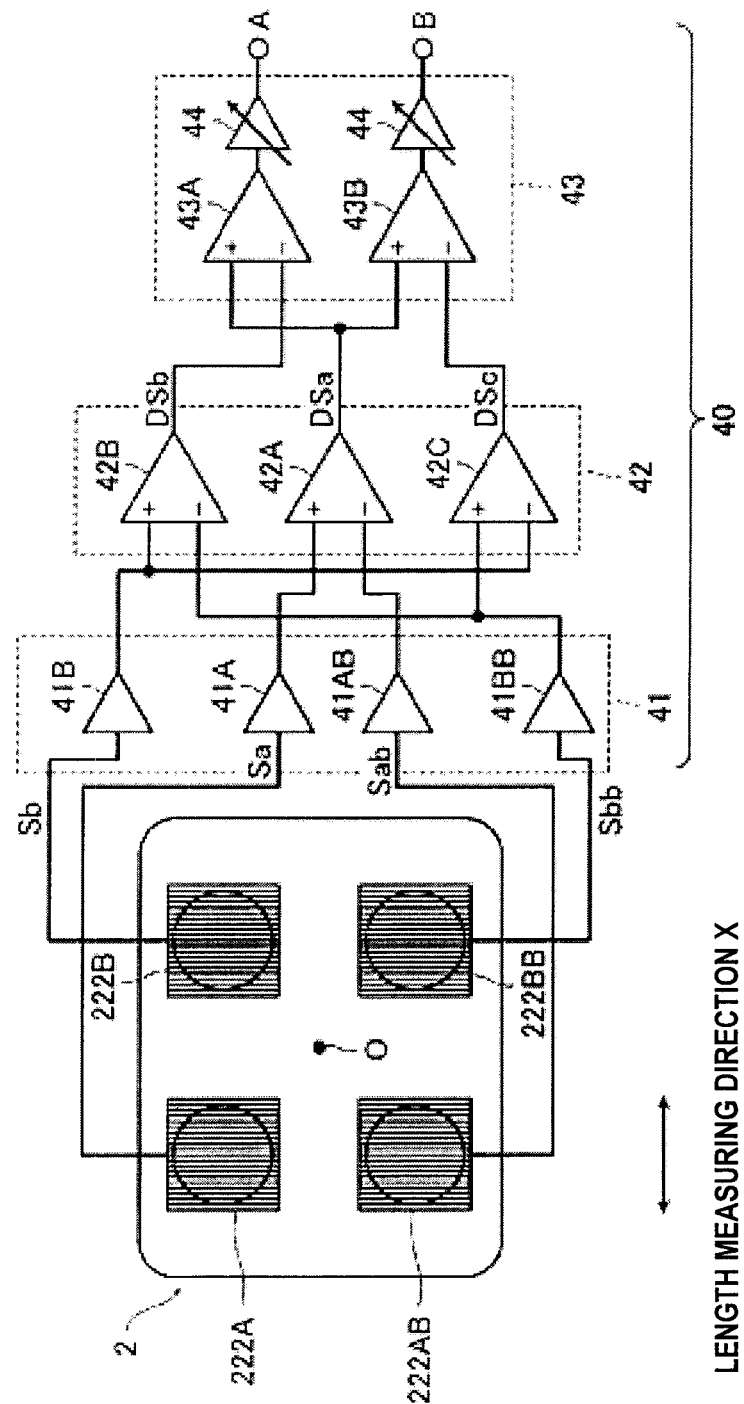
FIG. 6 is a circuit diagram showing a phase detecting circuit of the optical encoder.

FIG. 6 is a circuit diagram showing the configuration of the phase detecting circuit 40.

The phase detecting circuit 40 has a current/voltage converter 41, a three-phase signal producer 42, and a quadrature differential signal producer 43.

The current/voltage converter 41 is configured by current/voltage converting circuits 41A, 41B, 41AB, 41BB. The phase signals Sa, Sb, Sab, Sbb are supplied to the circuits, respectively. The three-phase signal producer 42 is configured by differential amplifying circuits 42A to 42C.

The differential amplifying circuit 42A amplifies the difference between the phase signals Sa, Sab, and outputs a first differential signal DSa. The first differential signal DSa is obtained by taking the difference between the phase signal Sa having the phase of 0 degree and the phase signal Sab having the phase of 180 degrees. The first differential signal DSa is a signal which, when there is no phase deviation between the phase signals Sa, Sab, has the phase of 0 degree that is identical with a reference phase.

Similarly, the differential amplifying circuit 42B amplifies the difference between the phase signals Sb, Sbb, and outputs a second differential signal DSb. The second differential signal DSb is obtained by taking the difference between the phase signal Sb having the phase of 90 degrees and the phase signal Sbb having the phase of 270 degrees. The second differential signal DSb is a signal which, when there is no phase deviation between the phase signals Sb, Sbb, has the phase of 90 degrees with respect to the reference phase.

In a same manner as the differential amplifying circuit 42B, the differential amplifying circuit 42C amplifies the difference between the phase signals Sb, Sbb, and outputs an inverted differential signal DSc. The inverted differential signal DSc is obtained as an inverted differential signal which is different in phase from the second differential signal DSb by 180 degrees. Namely, the inverted differential signal DSc is a signal having a phase difference of 270 degrees (i.e., −90 degrees) with respect to the reference phase. From the above, the three-phase differential signals DSa, DSb, DSc which are obtained in the three-phase signal producer 42 have a phase difference of 90 degrees with respect to each other.

The quadrature differential signal producer 43 has differential amplifying circuits 43A, 43B and a gain adjusting section 44 which adjusts the gains of their outputs. The first differential signal DSa and the second differential signal DSb are input to the differential amplifying circuit 43A. The differential amplifying circuit 43A performs vector synthesis of the two input signals DSa, DSb to produce an A-phase signal. Since the signal DSa having a phase of 0 degree and the signal DSb having a phase of 90 degrees are vector synthesized, the A-phase signal is a signal having a phase difference of 45 degrees with respect to the reference phase.

Similarly, the first differential signal DSa and the inverted differential signal DSc are input to the differential amplifying circuit 43B. The differential amplifying circuit 43B performs vector synthesis of the two input signals DSa, DSc to produce a B-phase signal. Similarly with the A-phase signal, since the signal DSa having a phase of 0 degree and the signal DSc having a phase of 270 degrees (−90 degrees) are vector synthesized, the B-phase signal is a signal having a phase difference of 315 degrees (i.e., −45 degrees) with respect to the reference phase. In this way, the obtained A- and B-phase signals have a phase difference of 90 degrees.

Figure 7:
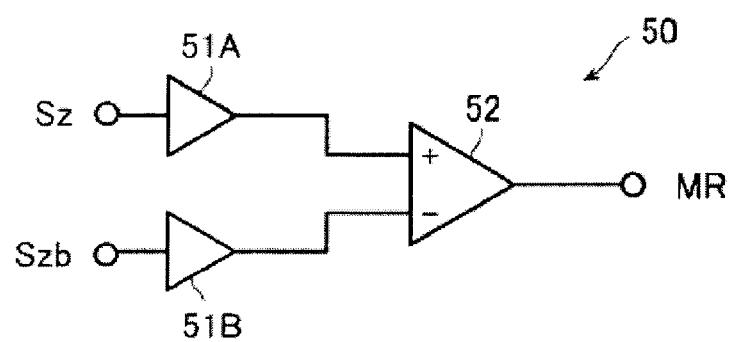
FIG. 7 is a circuit diagram showing a Roll detecting circuit of the optical encoder.

FIG. 7 is a circuit diagram showing the configuration of the Roll (and the origin) detecting circuit 50. The Roll detecting circuit 50 includes current/voltage converting circuits 51 and a differential amplifying circuit 52. The current/voltage converting circuits 51A, 51B amplify the posture monitor signals Sz, Szb which are obtained from light reception signals received by the posture monitor receiver portions 223Z, 223ZB respectively. The differential amplifying circuit 52 amplifies the difference between the amplified posture monitor signals Sz, Szb. When the intensities of the posture monitor signals Sz, Szb are equal to each other (at a position other than the origin), therefore, no signal is output from the differential amplifying circuit 52. In this configuration, in the case where the detection head 2 is rotated in the Roll direction, there is a difference between the distance between the posture monitor receiver portion 223Z and the scale 1, and that between the posture monitor receiver portion 223ZB and the scale 1, and hence an intensity difference is produced between the posture monitor signals Sz, Szb. Therefore, the differential amplifying circuit 52 outputs the posture monitor signal MR corresponding to the rotation angle of the detection head 2 in the Roll direction. The posture monitor windows 232 have a large width, and the posture monitor signals Sz, Szb have a constant output value independent of the phase relationships of the detection head 2 and the gratings of the scale 1. Therefore, the rotation of the detection head 2 in the Roll direction can be detected without moving the detection head 2 with respect to the scale 1.

Figure 8:
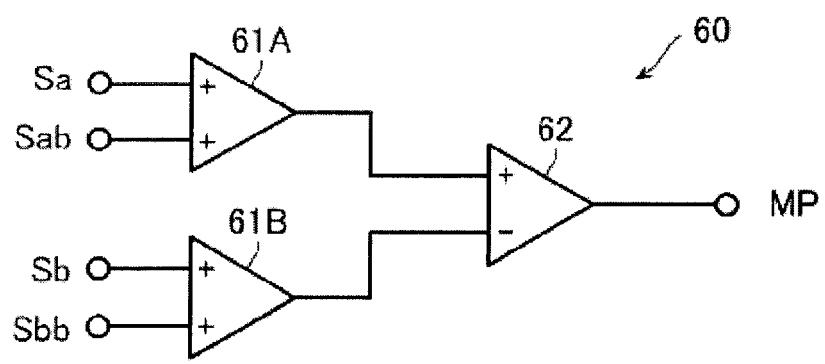
FIG. 8 is a circuit diagram showing a Pitch detecting circuit of the optical encoder.

FIG. 8 is a circuit diagram showing the configuration of the Pitch detecting circuit 60. The Pitch detecting circuit 60 includes adder circuits 61A, 61B and a differential amplifying circuit 62. The adder circuit 61A receives the phase signals Sa, Sab, and adds the signals together. The adder circuit 61B receives the phase signals Sb, Sbb, and adds the signals together. The differential amplifying circuit 62 amplifies the difference between the output of the adder circuit 61B and that of the adder circuit 61A, and outputs the posture monitor signal MP of the Pitch direction.

In the configuration, the phase signals Sa, Sab are opposite in phase to each other, and hence a DC current is output from the adder circuit 61A. Similarly, a DC current is output also from the adder circuit 61B. In the case where the sum of the phase signals Sa, Sab is equal to that of the phase signals Sb, Sbb, therefore, no signal is output from the differential amplifying circuit 62. In the embodiment, the receiver portions 222A, 222AB are disposed in the −X direction as viewed from the light source portion 21, and the receiver portions 222B, 222BB are disposed in the X direction as viewed from the light source portion 21. When the rotation in the Pitch direction is produced, therefore, a DC current corresponding to the rotation angle in the Pitch direction is output between the output of the adder circuit 61A and that of the adder circuit 61B. Also in this case, it is not necessary to change (move) the positional relationship between the detection head 2 and the scale 1.

Figure 9:
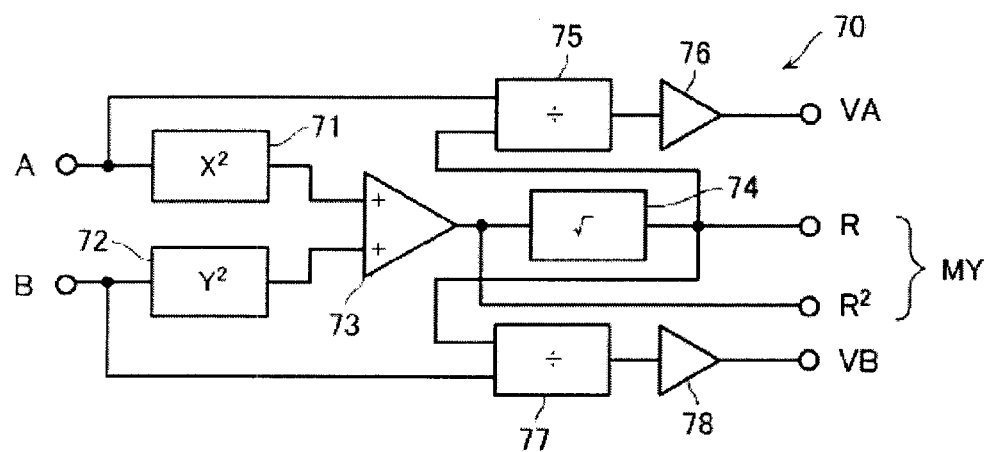
FIG. 9 is a circuit diagram showing a AGC/Yaw detecting circuit of the optical encoder.

Next, the AGC/Yaw detecting circuit 70 will be described. FIG. 9 is a circuit diagram showing the configuration of the AGC/Yaw detecting circuit 70. The AGC/Yaw detecting circuit 70 includes signal squaring blocks 71, 72, an adder circuit 73, a squaring root calculating block 74, divider circuits 75, 77, and amplifying circuits 76, 78. The quadrature differential signal A which is produced in the phase detecting circuit 40 is input to the signal squaring block 71. Similarly, the quadrature differential signal B is input to the signal squaring block 72. The output signals of the signal squaring blocks 71, 72 are added together by the adder circuit 73. As a result, the squaring value $R^2$ of the Lissajous radius of the quadrature differential signals A, B is obtained. The squaring value is converted to the squaring root by the squaring root calculating block 74, whereby the Lissajous radius R of the quadrature differential signals A, B is obtained. The Lissajous radius R or the squaring value $R^2$ thereof is output as the posture monitor signal MY of the Yaw direction. In the divider circuit 75, the quadrature differential signal A is normalized by the Lissajous radius R, amplified by the amplifying circuit 76, and output as the normalized quadrature differential signal VA. In the divider circuit 77, similarly, the quadrature differential signal B is normalized by the Lissajous radius R, amplified by the amplifying circuit 78, and output as the normalized quadrature differential signal VB.

In the configuration, when the detection head 2 is rotated in the Yaw direction, the signals which are received by the receiver portions 22 are deteriorated, and the Lissajous radius is contracted. The optical encoder of the embodiment detects the contraction of the Lissajous radius due to the rotation of the detection head 2 in the Yaw direction, and detects the Yaw rotation angle θyaw. In the configuration, the rotation in the Yaw direction may be adjusted so that the size of the Lissajous radius has the maximum value, or the Yaw rotation angle θyaw may be adjusted by previously detecting the size of the Lissajous radius in the best alignment state, setting the detected size as a reference value, and comparing the obtained Lissajous radius with the reference value.

Figure 10:
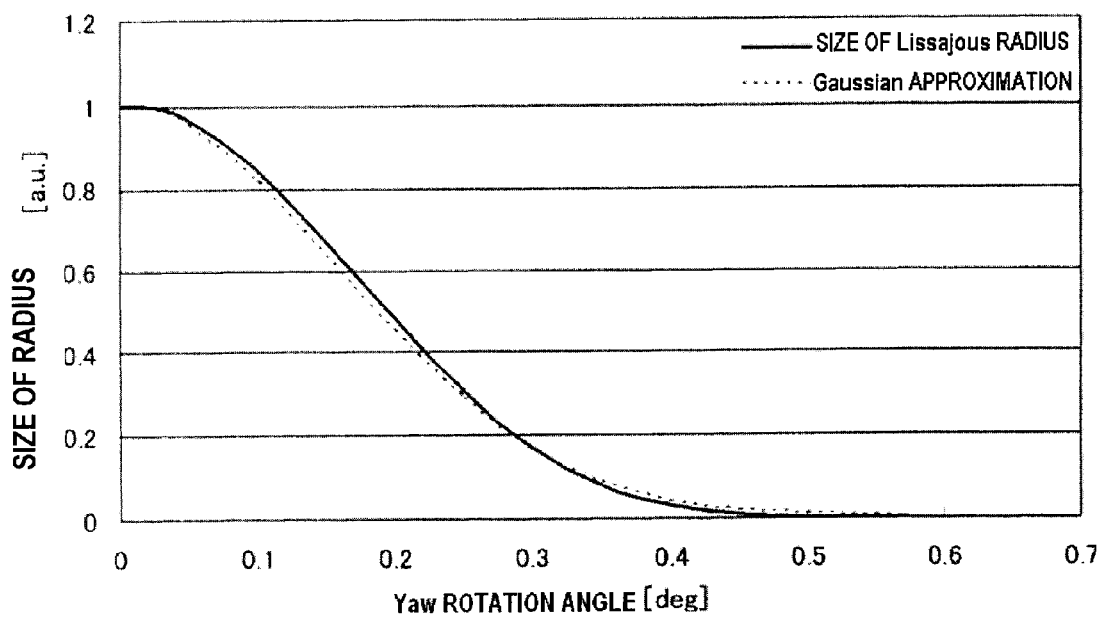
FIG. 10 is a graph showing a relationship between a size of the Lissajous radius and a rotation angle in a Yaw direction of the optical encoder.

FIG. 10 shows the manner of contraction of the Lissajous radius in accordance with the rotation of the detection head 2 in the Yaw direction. FIG. 10 is a graph showing relationships between the rotation angle in the Yaw direction and the size of the Lissajous radius. In the figure, the ordinate indicates the size of the Lissajous radius, and the abscissa indicates the rotation angle in the Yaw direction. FIG. 10 shows results of simulations in the case where the distance h between the scale 1 and the detection head 2 is 200 μm, and the pitches P of the optical grating of the scale 1 and the phase detection diffraction gratings 231 are 4 μm, the center-to-center distance of the receiver portions 22 is 200 μm, and the detection head 2 is rotated about the light source portion 21 in the Yaw direction.

When the scale period is indicated by P, the signal period due to diffraction interference is indicated by P/2, and the initial phase is Φ, the intensity $I_A$ of the A-phase signal and the intensity $I_B$ of the B-phase signal at the length measuring position x are indicated as follows:

$$I_A(X) = F(\theta yaw)\sin\left(2\pi x \cdot \frac{2}{P} + \Phi\right) \quad \text{[Exp. 1]}$$

$$I_B(X) = F(\theta yaw)\cos\left(2\pi x \cdot \frac{2}{P} + \Phi\right) \quad \text{[Exp. 2]}$$

where F(θyaw) indicates the signal amplitude, and can be expressed in the following manner:

$$F(\theta yaw) = H(\theta yaw) \cdot G(\theta yaw) \quad \text{[Exp. 3]}$$

where H(θyaw) indicates deterioration of the signal intensity of each receiver portion due to the rotation of the detection head 2 in the Yaw direction, and depends on the distance h between the scale 1 and the detection head 2, and the interference fringe period P, and G(θyaw) indicates deterioration of the signal intensity of the differential signal in opposite phase, and depends on the phase difference of phase signals S detected from a combination of receiver portions which are designed so as to receive the phase signals S in opposite phase, such as receiver portions 222A, 222AB, or the receiver portions 222B, 222BB.

From FIG. 10, it is seen that, as the rotation angle in the Yaw direction is lager, the size of the Lissajous radius R is more reduced. When the Yaw rotation angle is increased from 0.1° to 0.3°, particularly, the size of the Lissajous radius R is reduced to about one forth. In the range of the Yaw rotation angle from 0.0° to 0.1°, the change of the Lissajous radius R is relatively small, but sufficiently large as a signal, and hence can be used as the posture monitor signal MY.

According to the configuration, while the detection head 2 is rotated in the Yaw direction without relatively moving the scale 1 and the detection head 2 in the direction of the measurement axis, the maximum value of the posture monitor signal MY is detected, thereby enabling the adjustment of misalignment in the Yaw direction to be performed.

Second Embodiment

In the first embodiment, the Lissajous radius R of the quadrature differential signals A, B or a squaring value $R^2$ of the radius is used as the posture monitor signal MY of the Yaw direction. In the second embodiment, for example, the Lissajous radius R is approximated to a characteristic function, and an inverse function or differential function of the characteristic function is used. This can improve the adjustment resolution.

As shown in FIG. 10, for example, the relationship between the rotation angle and the size of the Lissajous radius can be Gaussian approximated. When the logarithm of the inverse function is used, therefore, the adjustment resolution in the region of the vicinity of 0.0° of the Yaw rotation angle (the vicinity of the best alignment) is improved.

Figure 11:
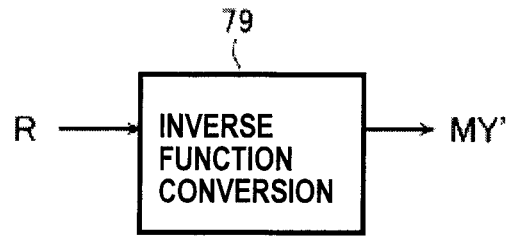
FIG. 11 is a block diagram showing a configuration of a part of a signal processing device in an optical encoder according to a second embodiment of the invention.

As shown in FIG. 11, therefore, an inverse function converting block 79 which performs the inverse function conversion to the Lissajous radius R is disposed in the AGC/Yaw detecting circuit 70, and the output of the block is set as a posture monitor signal MY' of the Yaw direction. When the Yaw rotation is adjusted by using the posture monitor signal MY', the adjustment work is further facilitated.

Hereinafter, taking the logarithmic conversion as an example of the inverse function conversion, the adjustment work in the embodiment will be described. In the example, MY' is calculated in the following manner. Namely, the relationship between the Yaw rotation angle θ and the size of the Lissajous radius such as shown in FIG. 10 is obtained. Next, normalization is performed on the characteristics, and the maximum value of the characteristics is set to 1. The size of the normalized radius is indicated by y(θ), and the following calculation is performed.

$$Y(\theta) = \sqrt{\frac{\log\{y(\theta)\}}{-2}} \quad \text{[Exp. 4]}$$

$$MY' = [\text{Value of allowable level}] - Y(\theta) \quad \text{[Exp. 5]}$$

Figure 12:
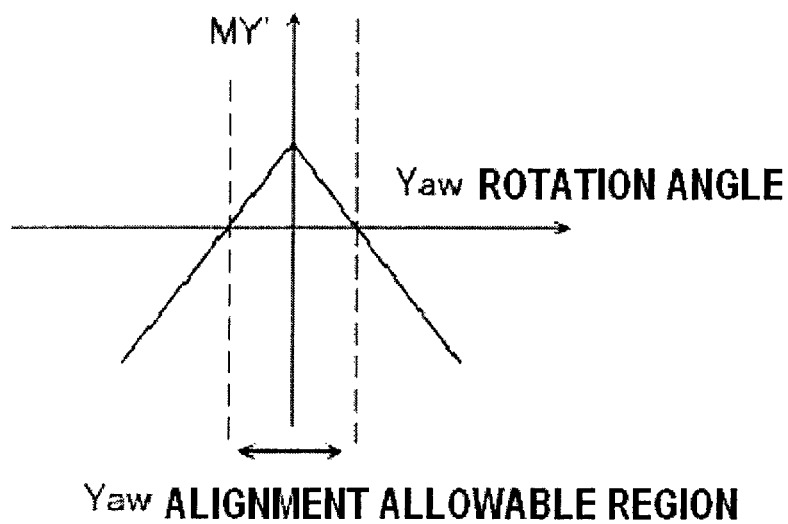
FIG. 12 is a graph showing a relationship between a posture monitor signal and a Yaw rotation angle θ.

FIG. 12 shows relationships between MY' calculated by using Exps. 4 and 5 above, and the Yaw rotation angle θ. The example of FIG. 12 is set so that MY' has a positive value in a predetermined alignment allowable region. In the configuration, as shown in FIG. 12, MY' uniformly changes also in a range where the Yaw rotation angle is in the vicinity of 0°, and therefore more accurate detection of the Yaw rotation angle, and an easy adjusting work can be performed.

In the adjustment method in which, as in the embodiment, an alignment allowable region is set and then it is determined whether the posture is within the alignment allowable region or not, unlike in the adjusting method in which the squaring value $R^2$ of the quadrature differential signals A, B is determined, normalization must be performed on the Lissajous radius. This is because, when normalization is not performed on the Lissajous radius, the alignment allowable region changes in accordance with the sizes of the receiver portions 22 and the distance between the light source portion 21 and the scale 1.

In this case, after the Roll adjustment and the Pitch adjustment (either of which may be first performed) are ended, the Yaw adjustment may be performed in the final step.

Third Embodiment

Figure 13:
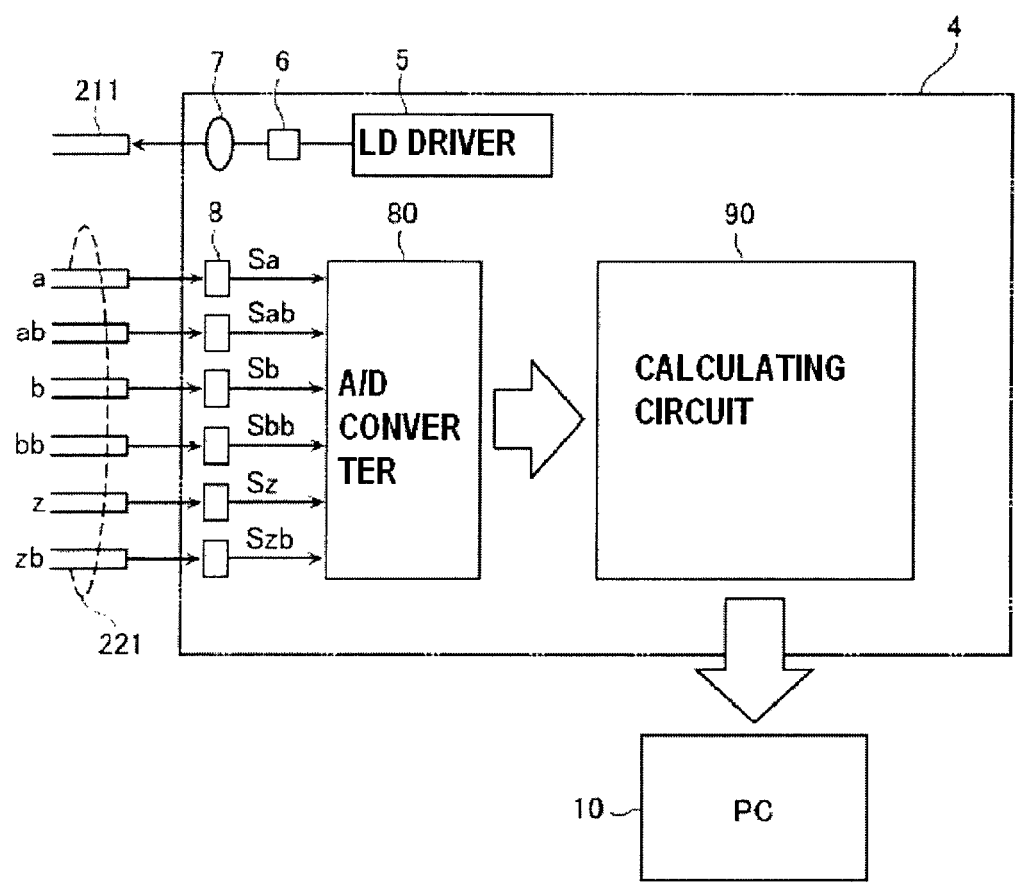
FIG. 13 is a block diagram showing a configuration of a signal processing device in an optical encoder according to a third embodiment of the invention.

FIG. 13 is a diagram showing an example in which the arithmetic process is realized by software using a microcomputer or a PC.

Namely, the signal processing device 4 includes an A/D converter 80 and a calculating circuit 90, in place of the phase detecting circuit 40, the Pitch detecting circuit 60, the Roll detecting circuit 50, and the AGC/Yaw detecting circuit 70. The calculating circuit 90 is connected to an external PC 10.

The A/D converter 80 converts the phase signals Sa, Sab, Sb, Sbb, and the posture monitor signals Sz, Szb to digital signals, and supplies the digital signals to the calculating circuit 90. The calculating circuit 90 calculates the quadrature differential signals A, B, the posture monitor signals MP, MR, the normalized quadrature differential signals VA, VB, the Lissajous radius R, and the like from the phase signals and posture monitor signals which are converted to digital signals, and supplies them to the PC 10. Alternatively, the phase signals and the posture monitor signals may be directly transmitted to the PC 10, and the PC 10 may calculate the posture monitor signals and the like.

In the embodiment, the arithmetic process is realized by software. With respect to an optical encoder in which a microcomputer is used in the signal processing device 4, or that in which the phase signals and the posture monitor signals are supplied to the PC 10, therefore, such software can be mounted with firmware or the like. It is possible to very economically provide an optical encoder in which misalignment detection and misalignment adjustment of the detection head is easily performed.

What is claimed is:

1. An optical encoder comprising:
a scale having diffraction gratings formed at predetermined pitches in a measurement axis direction;
a detection head relatively movable with respect to the scale, the detection head including a light source portion configured to irradiate the scale with light, and a plurality of receiver portions configured to receive light reflected by or transmitted through the diffraction gratings of the scale, at different phases, wherein the plurality of receiver portions are four receiver portions placed respectively in upper left, upper right, lower left, and lower right places centered at the light source portion, the four receiver portions being configured to receive light reflected by or transmitted through diffraction gratings of the scale that are different in spatial phase by 90° from each other; and
a signal processing device including a three-phase signal producer configured to perform differential amplification to light reception signals output from the four receiver portions of the detection head to generate three-phase signals having a phase difference of 90 degrees, and quadrature signal producer configured to perform vector synthesis of the three-phase signals to generate quadrature differential signals having a phase difference of 90 degrees; and
the signal processing device is configured to calculate posture monitor signals corresponding to a Lissajous radius of the quadrature differential signals in order to detect misalignment of the detection head with respect to the scale.

2. The optical encoder according to claim 1, wherein
the signal processing device is configured to approximate the Lissajous radius or a squaring value of the Lissajous radius to a characteristic function, and to obtain an inverse function or differential function of the characteristic function, as a monitor signal to detect misalignment of the detection head with respect to the scale.

3. A method of adjusting misalignment of a detection head of an optical encoder according to claim 1, comprising:
adjusting misalignment of the detection head in a Yaw direction with respect to the scale so that a monitor signal has a maximum value, the monitor signal being the Lissajous radius of the quadrature differential signals output from the signal processing device, or a squaring value of the Lissajous radius.

4. A method of adjusting misalignment of a detection head of an optical encoder according to claim 2, comprising:
adjusting misalignment of the detection head in a Yaw direction with respect to the scale so that the monitor signal is within an allowable range.

5. The optical encoder according to claim 1, wherein the three-phase signals comprise first, second, and third differential signals which have a phase difference of 90 degrees from each other.

6. The optical encoder according to claim 1, wherein
the three-phase signals comprise first, second, and third differential signals, the first differential signal having a phase of 0 degree with respect to a reference phase, the second differential signal having a phase of 90 degrees with respect to the reference phase, and the third differential signal having a phase of −90 degrees with respect to the reference phase.

7. The optical encoder according to claim 1, wherein
the three-phase signals comprise first, second, and third differential signals, the first differential signal having a difference between the phase signal of the light received by the upper left receiver portion and the phase signal of the light received by the lower left receiver portion, the second differential signal having a difference between the phase signal of the light received by the upper right receiver portion and the phase signal of the light received by the lower right receiver portion, and the third differential signal being an inverted signal of the second differential signal.

8. The optical encoder according to claim 6, wherein
the quadrature differential signals comprise fourth and fifth differential signals, the fourth differential signal having a difference between the first and second differential signals and the fifth differential signal having a difference between the first and third differential signals.

9. The optical encoder according to claim 8, wherein
the fourth differential signal has a phase of 45 degree with respect to the reference phase and the fifth differential signal has a phase of −45 degrees with respect to the reference phase.

10. The optical encoder according to claim 7, wherein the quadrature differential signals comprise fourth and fifth differential signals, the fourth differential signal having a difference between the first and second differential signals and the fifth differential signal having a difference between the first and third differential signals.

11. The optical encoder according to claim 10, wherein the fourth differential signal has a phase of 45 degree with respect to the reference phase and the fifth differential signal has a phase of −45 degrees with respect to the reference phase.

12. The optical encoder according to claim 1, wherein the optical encoder is configured to detect the misalignment of the detection head without moving the detection head in the measurement axis direction.

13. The method according to claim 3, wherein the misalignment of the detection head in the Yaw direction is adjusted without moving the detection head in the measurement axis direction.

14. The method according to claim 4, wherein the misalignment of the detection head in the Yaw direction is adjusted without moving the detection head in the measurement axis direction.

* * * * *